Feb. 21, 1956 C. E. BECK 2,735,443
AUTOMATIC BI-DIRECTIONAL FLOW VALVES
Filed Feb. 26, 1953
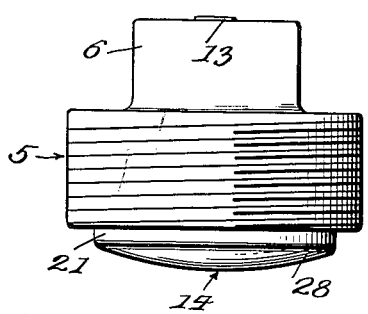
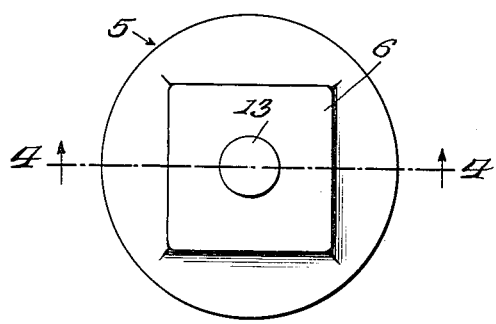
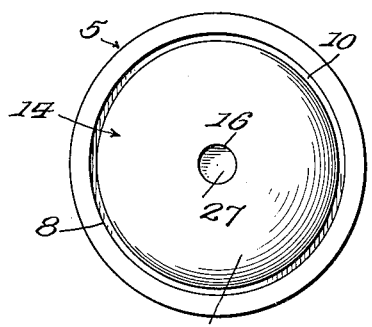
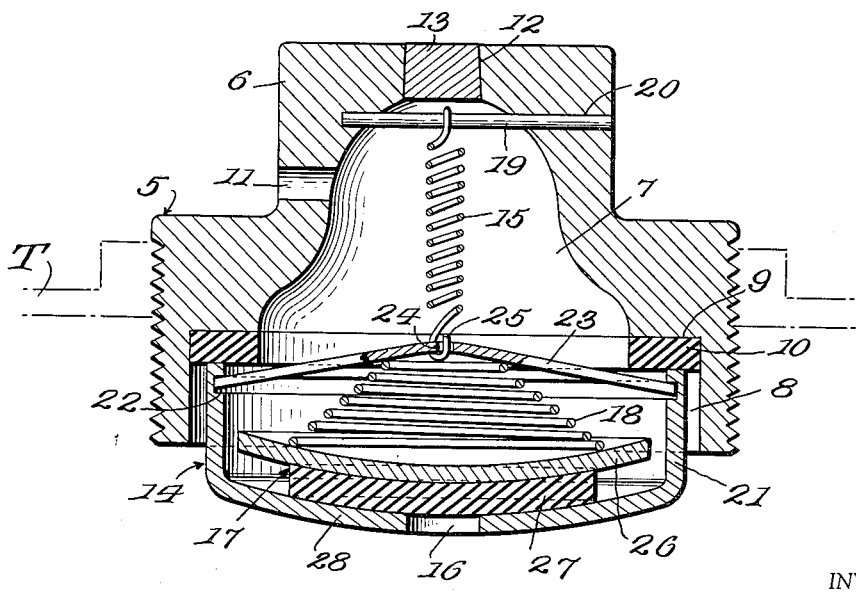
INVENTOR
Clarence E. Beck
BY
ATTORNEY.

United States Patent Office 2,735,443
Patented Feb. 21, 1956

2,735,443

AUTOMATIC BI-DIRECTIONAL FLOW VALVES

Clarence E. Beck, Tipton, Ind.

Application February 26, 1953, Serial No. 339,052

1 Claim. (Cl. 137—493.3)

This invention relates to a novel valve device for controlling the pressure within the head space of a liquid tank, for example, a volatile fuel storage tank or the fuel tank of an automobile, tractor or other machine. In the present disclosure, the invention embodies a screw plug carrying valve parts and adapted to be used in place of a common tank filling plug or cap.

One object of the invention is to provide a relatively simple and inexpensive valve which will obviate the necessity of a constantly open vent from the tank to the atmosphere, thereby overcoming evaporation losses.

Another object of the invention is to provide a novel valve which will maintain sufficient pressure in the head space over the fuel to minimize evaporation, yet will allow pressure escape in case it should rise to a dangerous degree.

A further object is to provide a novel valve which will admit atmospheric air into the head space of the tank as fuel is drawn off from the latter, thereby relieving the partial vacuum which would otherwise be formed and which would interfere with flow from the tank.

A still further object is to provide a novel valve which will be operated by pressure conditions within the tank, to either admit air or permit escape thereof as required.

Yet another object is to provide for rapid escape of tank pressure in case of fire so close to the tank as to heat the latter and its contents, thus lessening danger of explosion.

Still another object is to provide a simple construction which may be easily and inexpensively manufactured, may be profitably sold at a reasonable price, and will give carefree service for a long period of time.

With the above and other objects in view that will become apparent as the nature of the invention is better understood, the same consists in the novel form, combination and arrangement of parts hereinafter more fully described, shown in the accompanying drawing, and claimed.

In the drawing:

Figs. 1, 2, and 3, are respectively a side elevation, a top view and a bottom view, and Fig. 4 is an enlarged diametrical section on line 4—4 of Fig. 2.

A preferred construction has been shown in the drawing and will be rather specifically described, but it is to be understood that variations may be made within the scope of the invention as claimed.

A screw-plug 5 is provided for reception in an opening in a tank top T, said plug having a wrench-engaging head 6. This plug is formed with a recess 7 which opens through its lower end. The lower end of this recess is enlarged at 8, providing a downwardly facing annular shoulder 9 against which a yieldable seat ring 10 is cemented. The head 6 is formed with a small vent 11 and with a much larger opening 12, the latter being normally sealed by a fusible safety plug 13.

Either totally or partially within the enlarged recess end 8, there is a check valve 14 which is held yieldably against the seat ring 9 by means of a coiled suspension spring 15. This valve member 14 is formed with an opening 16 which is normally closed by a second check valve 17, the latter being yieldably seated by means of a coiled compression spring 18. The valve member 14 opens inwardly with respect to the tank and serves to admit air as required, to prevent formation of a partial vacuum as fuel is drawn from said tank and when the plug is being unthreaded and removed for tank refilling. The valve member 17 opens outwardly with respect to the tank and acts to relieve pressure above a predetermined amount. The excess pressure normally escapes through the small vent 11, but if the tank should become sufficiently hot from an adjacent fire, the fusible plug 13 will melt, thereby permitting rapid escape of pressure and minimizing danger of explosion.

The spring 15 suspends the assembly of valves and may be connected in any suitable way with the plug 5. In the present disclosure, a pin 19 is driven into a drilled opening 20 in the head 6, and the upper end of the spring 15 is hooked around said pin. The two valve members 14 and 17 and the spring 18 may be assembled as a unit and the spring 15 engaged with the pin 19. This spring 15 may then be stretched and hooked onto the valve assembly while this assembly is sufficiently spaced from the plug 5 to permit this hooking operation. Assembly is thus facilitated.

In the present disclosure the valve member 14 is in the form of a metal cup having the opening 16 in its bottom. The upper edge of the cup side wall 21 seats against the seat ring 10 and is formed with a circumferential groove 22 in its inner periphery. This groove receives the ends of a diametrical spring metal snap bar 23 having a central opening 24 with which the hook 25 of the spring 15 is engaged. The valve member 17 is confined within the cupped valve member 14, and the spring 18 abuts the bar 23, said spring being preferably conical as shown.

The valve member 17 preferably comprises a metal disk 26 and a yieldable disk 27 cemented to the lower side of said metal disk. The yieldable disk 27 abuts the bottom of the cupped valve member 14 and normally closes the opening 16. Both disks 26 and 27 and the bottom 28 of the valve member 14 are preferably of concave-convex form.

The building up of excess pressure within the head space of the tank will open the valve member 17 and such pressure will escape through the small vent opening 11. Then, too, if heat from a fire should melt the plug 13, the escape of pressure will be more rapid and the explosion hazard will be greatly reduced. Pressure reduction in the tank sufficient to cause a partial vacuum will result in opening of the valve member 14 and admission of atmospheric air. Such a vacuum cannot therefore cause evaporation of fuel and cannot interfere with drawing of fuel from the tank. Here, it may be stated that while the primary use of the invention is on volatile fuel tanks, the device could well be employed on other liquid tanks with equal advantage.

From the foregoing it will be seen that a novel and advantageous construction has been provided for attaining the desired ends, and while there is herein shown and described the preferred embodiment of the invention, it is nevertheless to be understood that minor changes may be made therein without departing from the spirit and scope of the invention as claimed.

I claim:

In a pressure control valve for a liquid tank, a body having a downwardly opening recess therein, externally threaded at its lower open end and an annular shoulder inwardly of the open end constituting a valve seat, a yieldable ring on said seat, said body having a vent opening therein upwardly of the valve seat, reversely operating check valves comprising a cup-shaped member in the open end of said body with the edge of the side wall of said member engaged with the yieldable ring on the valve seat, a cross bar extending diametrically of the side wall of the cup-shaped member adjacent the open side thereof, a spring support for the cup-shaped member extending between the upper closed end of the body and the central portion of the cross bar for holding the cup-shaped member freely suspended within the body and engaged with the yieldable ring in the body with said member constituting an outwardly opening check valve, said cup-shaped member having a central valve opening in the bottom thereof, a yieldable valve disk mounted in the cup-shaped member and a separate spring interposed between said cross bar and valve disk for holding the latter in closing relation to the valve opening and said valve disk constituting an inwardly opening check valve.

References Cited in the file of this patent

UNITED STATES PATENTS

| | | |
|---|---|---|
| 587,094 | Goehring | July 27, 1897 |
| 1,342,985 | Cash | June 8, 1920 |
| 1,885,121 | Loweke | Nov. 1, 1932 |
| 2,191,614 | Frantz | Feb. 27, 1940 |
| 2,191,636 | Walker | Feb. 27, 1940 |
| 2,573,983 | Ofeldt | Nov. 6, 1951 |